J. J. MARTIN.
SELF SETTING TRAP.
APPLICATION FILED JULY 12, 1920.

1,407,558.

Patented Feb. 21, 1922.
2 SHEETS—SHEET 1.

WITNESSES:
F. L. Fox.
L. B. Middleton.

J. J. Martin.
INVENTOR
BY Victor J. Evans.
ATTORNEY

J. J. MARTIN.
SELF SETTING TRAP.
APPLICATION FILED JULY 12, 1920.
1,407,558. Patented Feb. 21, 1922.
2 SHEETS—SHEET 2.
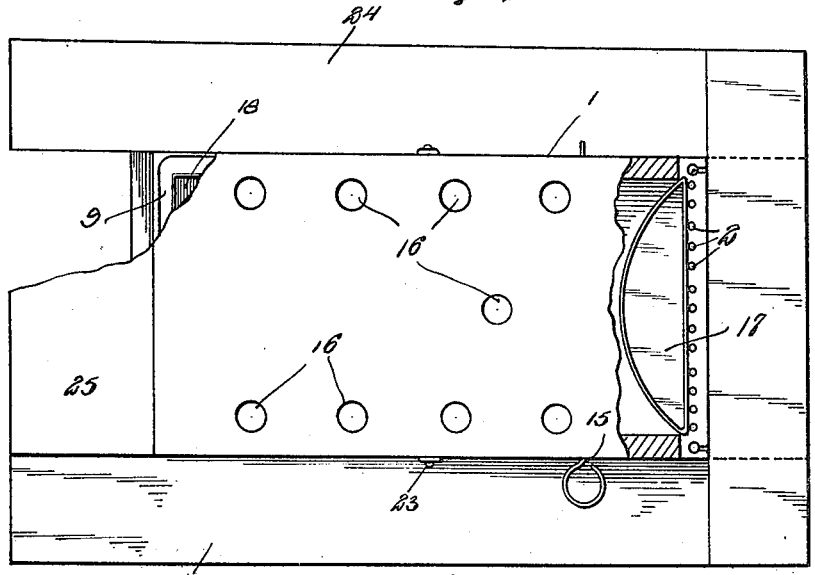
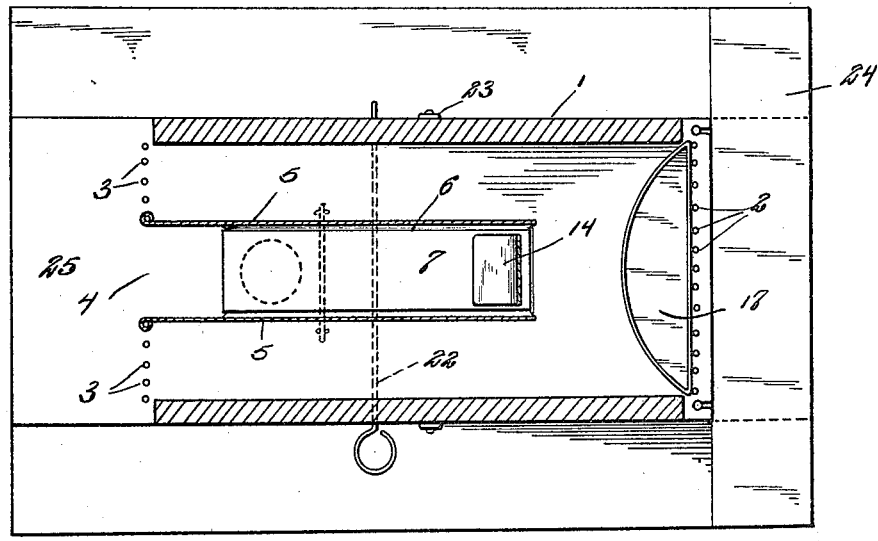

UNITED STATES PATENT OFFICE.

JOSEPH JETER MARTIN, OF NATHALIE, VIRGINIA.

SELF-SETTING TRAP.

1,407,558.  Specification of Letters Patent.  Patented Feb. 21, 1922.

Application filed July 12, 1920. Serial No. 395,597.

*To all whom it may concern:*

Be it known that I, JOSEPH J. MARTIN, a citizen of the United States, residing at Nathalie, in the county of Halifax and State of Virginia, have invented new and useful Improvements in Self-Setting Traps, of which the following is a specification.

This invention relates to an animal trap of the type in which the animal is precipitated into a receptacle by a tiltable platform and the principal object of the invention is to provide means whereby the trap is self-setting and may be rendered inactive when it is desired to permit the animals to become familiar with the same.

Another object of the invention is to provide a hinged member operated by the tiltable member for preventing the animal from running off the tiltable member as the same is moving downwardly under the weight of the animal.

A still further object of the invention is to provide a receptacle with two compartments for receiving the rats which are adapted to contain water so that when the lower compartment is full the water will overflow into the upper compartment.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a top view with parts broken away.

Figure 4 is a horizontal sectional view on line 4—4 of Figure 3.

Figure 1:
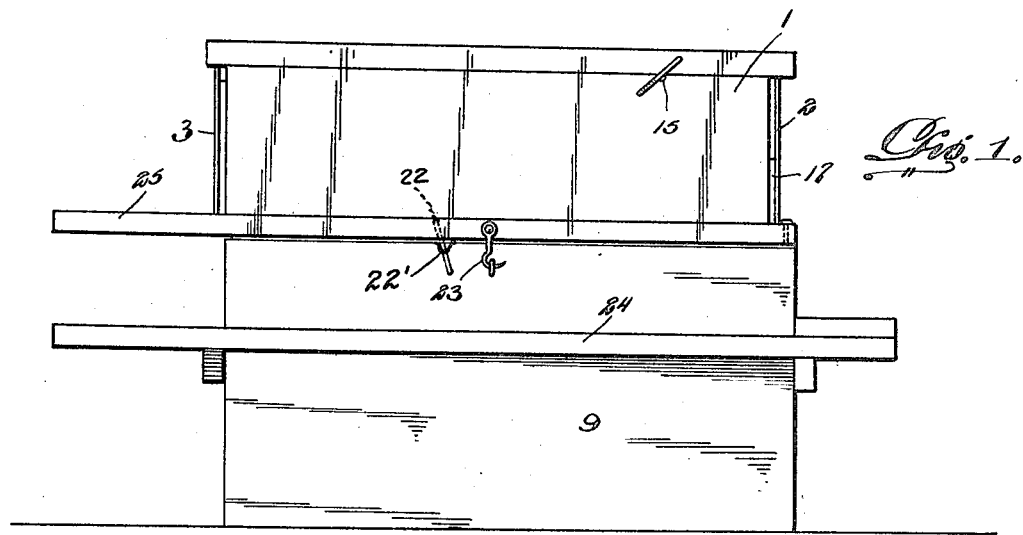
Figure 1 is a side view of the invention.
Figure 3:
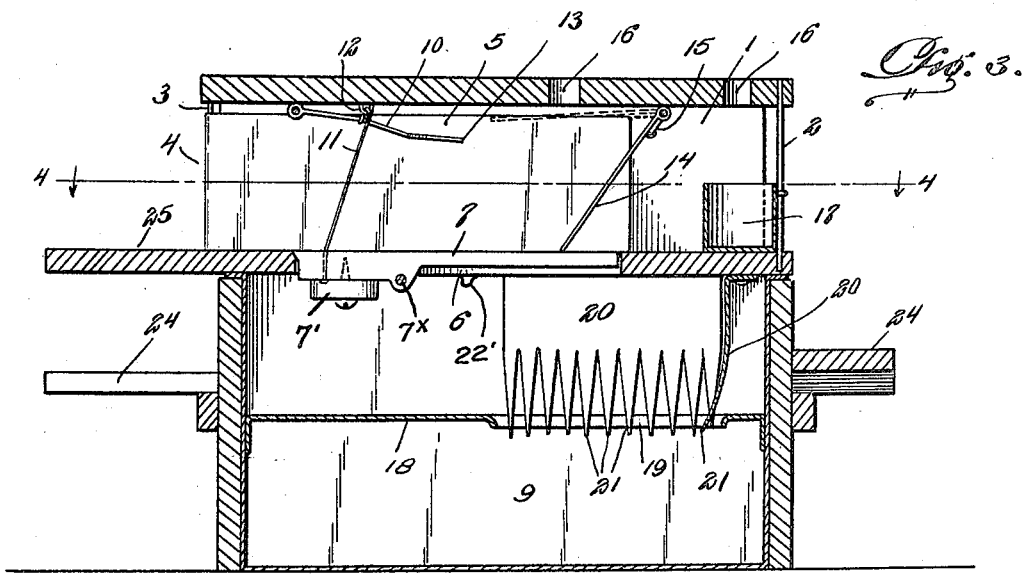
Figure 3 is a longitudinal vertical sectional view certain parts being shown in full.

In these views 1 indicates a box or casing which has its ends open, the rear end having the bars or wires 2 extending across the same and the front end having the bars or wires 3 closing the side portions thereof but leaving a central opening 4. Partition plates 5 extend longitudinally along the central part of the box with the front ends adjacent the innermost bars at the front of the box and their rear ends spaced a considerable distance from the bars at the rear of the box. These plates form a passageway for the animals entering the opening 4. The bottom of the box along this passageway is cutaway to form an elongated opening 6 and this opening is adapted to be closed by the tiltable member 7. This member is pivoted to the bottom of the box by the pin $7^x$ an appreciable distance from its front end and the bottom face of this front end carries a weight 7' which tends to hold the member in horizontal position and closing the opening.

It will thus be seen that as the animal enters the opening or passes along the passageway it will pass over the tiltable member and when it passes beyond the pivot thereof its weight will cause the member to tilt and thus the animal will be precipitated through the opening into the receptacle 9 upon which the box is placed.

In order to prevent the rat from running off the member when the same starts to tilt I provide a hinged plate 10 which is hinged at its front end to the under face of the cover of the box so that the other end of the plate will tend to drop down upon the tiltable member under the action of gravity. The plate is held in raised position, however, when the tiltable member is in horizontal position, by means of the string 11 connected with the plate and passing over a guide 12 on the cover of the box and downwardly to the front end of the tiltable member to which it is attached. This string is of such a length that when the tiltable member is in a horizontal position the plate will be held in raised position but when the member is tilted the string will slack and permit the weight of the plate to cause it to swing downwardly and engage the front end of the tiltable member. The free end of the plate may be provided with fingers 13.

I also provide a swinging plate 14 for preventing the animal from passing between the rear ends of the partition plates. This plate 14 has its upper end secured to a bar 15 which extends transversely through the upper part of the box and is provided with a handle exteriorly of the box so that the plate may be swung downwardly or upwardly manually when desired. The cover of the box is provided with a plurality of openings 16 through which the bait may be dropped into the box from both sides of the partition plates. I also place a trough 17 in the rear of the box for containing water or the like. The receptacle 9 upon which the box rests is formed by the partition plate 18 into an upper chamber and a lower chamber, said partition plate having an opening 19 therein which is located partly under the opening 6 in the bottom of the box. Guide plates 20 are secured to the under face of the bottom of the box at the sides and rear ends of opening 6 for directing the animal dropping through said opening through the opening 19 into the lower chamber, said plates having spring fingers 21 at their lower edges which are curved inwardly and which are so formed as to permit the animal to fall down into the lower chamber but will prevent the animal from returning from the lower chamber through said opening 19. When the lower chamber has received a number of animals the level of the water in the receptacle will be raised so that the upper chamber will be partly filled but the animals cannot reach the upper chamber and alarm the rats entering the trap.

In order to permit the animals to become familiar with the trap I provide means for preventing the tilting member from moving, such means consisting of a bar 22 which is adapted to be placed between the receptacle and the box and to have a part engage the tiltable member so as to prevent the same from being tilted. I may provide notches 22' in the upper edges of the receptacle to receive said bar. When this bar is in place the plate 14 is swung upwardly by its bar 15 so that the animals can pass along the passageway into the rear part of the box and from here pass to the side spaces between the partition plates and the sides of the box so as to reach the bait in these side spaces and also the water or other material in the trough. When the trap is kept in this inactive position for a few nights the rats will become used to the same and will pass in and out of the box to get at the bait. Then the bar 22 is removed and the plate 14 swung downwardly to close the rear end of the passageway so that when the rat walks into the passageway and upon the tiltable member the same will swing downwardly under his weight and precipitate him into the receptacle below. The member will then swing back into normal position ready for the next rat. As the tiltable member swings downwardly the plate 10 will also swing downwardly and thus prevent the rat from escaping off the member. When the member returns to normal position the plates will be raised by the string. The trap will be detachably connected with the receptacle by the latch means 23 and I may provide a runway or shelf 24 around the receptacle and extend the front end of the bottom of the box, as at 25, to facilitate the rats entering the box.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A trap of the class described comprising a box having a passageway therein, the bottom of the passageway having an opening therein, a tiltable platform closing said opening, a weight normally holding the platform in horizontal position, a receptacle below the box for receiving the animals, a plate hinged at its front end to the top of the box and adapted to swing downwardly under the action of gravity to close the front end of the passageway, a guide at the top of the box and a flexible member passing through said guide and having one end connected with the weighted end of the platform and its other end connected with the plate so as to hold the plate in raised position when the platform is in normal position.

2. A trap of the class described comprising a box having a passageway therein, the bottom of the passageway having an opening therein, a tiltable platform closing said opening, a weight normally holding the platform in horizontal position, a receptacle below the box for receiving the animals, a detachable member for preventing the tilting movement of the platform and a manually movable plate hinged to the top of the box and adapted to close the rear end of the passageway when swung downwardly.

3. A trap of the class described comprising a box having its ends open, spaced bars closing said ends, two partition plates centrally arranged in the box and forming a passageway therein, the said plates terminating short of the rear end of the box, the bottom of the box having an opening in the passageway, a tiltable platform closing said opening, a plate hinged to the top of the box and normally extending downwardly to close the rear end of the passageway, means for permitting the said plate to be swung upwardly out of the passageway, means for permitting bait to be placed in the box adjacent the rear end of the passageway and at the sides thereof and a receptacle below the box for receiving the animals.

4. A trap of the class described comprising a box, an opening in the bottom of the box, a tiltable platform closing said opening, a receptacle located below the box, a partition plate in said receptacle dividing the same into an upper and lower chamber, said partition plate having an opening therein and guiding plates secured to the bottom of the box for directing the animals falling through the opening in the bottom of the box and through the opening in the partition plate into the lower chamber, said guiding plates having spring fingers at their lower edges.

In testimony whereof I affix my signature.

JOSEPH JETER MARTIN.